June 10, 1930.  L. CHALKLEY, JR  1,762,760
MACHINE FOR EXHIBITING PHOTOLUMINESCENT IMAGES
Filed Oct. 5, 1927

INVENTOR
Lyman Chalkley, Jr.

Patented June 10, 1930

1,762,760

UNITED STATES PATENT OFFICE

LYMAN CHALKLEY, JR., OF STATE COLLEGE, PENNSYLVANIA

MACHINE FOR EXHIBITING PHOTOLUMINESCENT IMAGES

Application filed October 5, 1927. Serial No. 224,065.

My invention relates to a machine for exhibiting images prepared with luminous pigments.

It is known that through the absorption of light certain substances become capable of themselves giving off light even after their exposure to the exciting light has been terminated. Such photoluminescent substances have already been used for the preparation of images which, after exposure to light, glow in the dark and present a novel and striking appearance. The purpose of the present invention is to provide a machine to effectively exhibit such photoluminescent images.

A feature of my invention is the division of the machine into two parts or compartments. In one compartment a source of exciting light is provided, and this light source is screened from outside observation. Means are provided for moving properly supported luminous images from one compartment into the other and back again in such a way as to expose the image alternately first to the exciting light source and then to the view of an outside observer.

Figure 1:
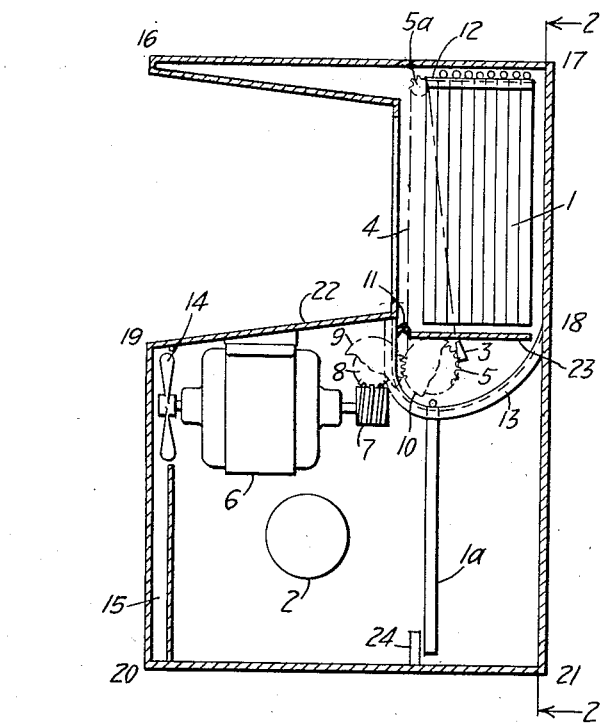
Figure 2:
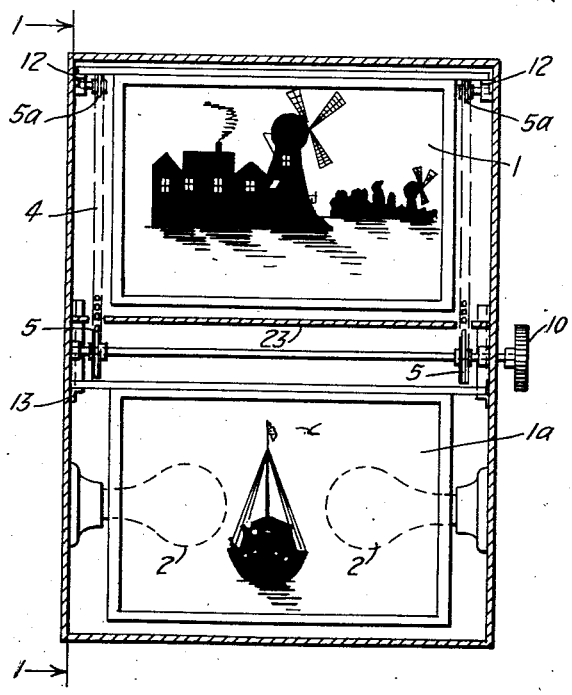

An approved form of the invention is shown in the accompanying drawings. Figure 1 is a cross-sectional view from the side; Figure 2 is a sectional view from the front.

The photoluminescent images are mounted on movable frames, 1 and 1ª. After having been exposed to the light sources, 2, the frame 1ª is picked up by the pushers, 3 (Fig. 1), carried by the continuous chains, 4. The projecting top bar of the frame 1ª is lifted over the sprockets 5ª onto the tracks 12. The placing of the frame 1ª on the tracks 12 pushes back the frames 1 already on the tracks 12 so that the last frame falls off of the tracks 12 onto the tracks 13, and thus into the position originally occupied by the frame 1ª. The stop, 24, prevents the frames, as they fall into the position originally occupied by 1ª, from swinging forward and hitting the lights, 2.

The continuous chains, 4, pass over the sprockets 5 and 5ª. They are actuated by the sprockets 5 which are rotated by means of the motor, 6, operating through the worm, 7, worm gear, 8, and spur gears, 9 and 10.

In order to keep the lamps, 2, and motor, 6, cool the motor operates a fan, 14. The chamber 15 is a light trap with openings on the side to permit air to pass out of the compartment 18—19—20—21 without allowing light to pass out.

The partitions, 22 and 23, combined with the light tight flaps, 11, of velvet or other suitable material prevent light from the sources, 2, passing up into the compartment 16—17—18—19. Thus the box is divided into two compartments, 16—17—18—19 and 18—19—20—21. The interior of the lower compartment, including the light sources, 2, is not visible to outside observation. The compartment 16—17—18—19 is open across the space 16—19, and this construction permits an outside observer to view each newly stimulated luminous image when it is carried by the pushers, 3, and chains, 4, up onto the tracks, 12.

What I claim and desire to secure by Letters Patent is:

A machine comprising: a box divided into two compartments, one above the other, the lower compartment containing a light source screened from outside view, and the upper compartment having an opening such that its interior may be seen from the outside; a plurality of movable frames bearing photoluminescent images, and continuous tracks for the frames to move on; an electric motor, two sprocket gears rotated by the motor, two continuous chains carrying pushers and actuated by the sprockets; the whole operating in such a way that a frame bearing a photoluminescent image after exposure of the image to the light source in the lower compartment is picked up by the pushers and is carried by the chains into the upper compartment and before the opening thereof so as to exhibit the photoluminescent image, the introduction of the frame into the upper compartment causing the release of a second frame so that it falls by force of gravity into the lower compartment and into the position originally occupied by the first frame.

LYMAN CHALKLEY, JR.